United States Patent [19]

Kommrusch

[11] Patent Number: 4,742,562

[45] Date of Patent: May 3, 1988

[54] SINGLE-BLOCK DUAL-PASSBAND CERAMIC FILTER USEABLE WITH A TRANSCEIVER

[75] Inventor: Richard S. Kommrusch, Schaumburg, Ill.

[73] Assignee: Motorola, Inc., Schaumburg, Ill.

[21] Appl. No.: 881,567

[22] Filed: Jul. 2, 1986

Related U.S. Application Data

[63] Continuation of Ser. No. 656,121, Sep. 27, 1984, abandoned.

[51] Int. Cl.[4] .......... H04B 1/50; H01P 2/05

[52] U.S. Cl. .......... 455/78; 333/134; 333/202; 333/206

[58] Field of Search .......... 333/202, 206, 207, 219, 333/222, 223, 235, 134; 455/73, 78-83; 370/30, 36, 38

[56] References Cited

U.S. PATENT DOCUMENTS

| | | | |
|---|---|---|---|
| 3,505,618 | 4/1970 | McKee | 333/203 |
| 3,876,963 | 4/1975 | Graham | 333/206 X |
| 4,410,868 | 10/1983 | Meguro et al. | 333/202 |
| 4,425,555 | 1/1984 | Meguro et al. | 333/202 |
| 4,426,631 | 1/1984 | D'Avello et al. | 333/202 |
| 4,431,977 | 2/1984 | Sokola et al. | 333/206 |
| 4,450,421 | 5/1984 | Meguro et al. | 333/202 |
| 4,462,098 | 7/1984 | D'Avello et al. | 370/30 |
| 4,464,640 | 8/1984 | Nishikawa et al. | 333/202 |
| 4,523,162 | 6/1985 | Johnson | 333/202 |

FOREIGN PATENT DOCUMENTS

| | | | |
|---|---|---|---|
| 0093956 | 11/1983 | European Pat. Off. . | |
| 0041017 | 3/1982 | Japan | 333/202 |
| 0073501 | 5/1982 | Japan | 333/202 |
| 009402 | 1/1983 | Japan | 333/227 |
| 0056501 | 4/1983 | Japan | 333/202 |
| 0168302 | 10/1983 | Japan | 333/202 |
| 0019405 | 1/1984 | Japan | 333/206 |
| 0126302 | 7/1984 | Japan | 333/223 |
| 0114902 | 7/1984 | Japan | 333/202 |

OTHER PUBLICATIONS

R. Pregla, "Microwave Filters of Coupled Lines and Lumped Capacitances", *IEEE Transactions on Microwave Theory and Techniques*, vol. MTT-18, pp. 278-280 (May, 1970).

R. Pregla, "Mikrowellenfilter aus Verkoppelten Leitungen und Konzentrierten Kapazitaten", *Archiv Der Elektrischen Ubertragung*, vol. 23, No. 12, pp. 593-600 (1969).

*Primary Examiner*—Gene Wan

*Assistant Examiner*—Benny T. Lee

*Attorney, Agent, or Firm*—Rolland R. Hackbart

[57] ABSTRACT

A single-block ceramic filter (100) providing both pass and stop bands couples an RF signal from transmitter (180) to an antenna (190) and an RF signal from the antenna (190) to a receiver (170). The ceramic filter (100) includes seven holes (102, 104, 106, 108, 110, 112 and 114) each having an elongated cross section and being surrounded by capacitive strips (e.g. 130, 131, 140 and 141 for hole 106), and electrodes (120, 122 and 124) coupled to receiver (170), transmitter (180) and antenna (190), respectively. A bracket (150) may be soldered to the ceramic filter (100) for holding cables coupled to the receiver, transmitter and antenna and for mounting the ceramic filter in a radio transceiver.

31 Claims, 3 Drawing Sheets

SINGLE-BLOCK DUAL-PASSBAND CERAMIC FILTER USEABLE WITH A TRANSCEIVER

This is a continuation of application Ser. No. 656,121, filed 9-27-84, now abandoned.

BACKGROUND OF THE INVENTION

The present invention is related generally to radio frequency (RF) signal filters, and more particularly to an improved single-block ceramic filter that is particularly well adapted for use in radio transmitting and receiving circuitry.

Conventional multi-resonator filters include a plurality of resonators that are typically foreshortened short-circuited quarter-wavelength coaxial or helical transmission lines. The resonators are arranged in a conductive enclosure and may be inductively coupled one to another by apertures in their common walls. Each resonator can be tuned by means of a tuning screw which inserts into a hole extending through the middle of the resonator. Once tuned, the overall response of the filter is primarily determined by the size of the interstage coupling apertures. Since the tuning of such filters can be disturbed by a slight adjustment of the tuning screw, a lock nut is required to keep the tuning screw properly positioned at all times. The use of tuning screws not only renders these filters susceptible to becoming detuned, but also creates additional problems including mechanical locking of the tuning screw and arcing between the tuning screw and the resonator structure. Furthermore, such filters tend to be rather bulky and therefore are relatively unattractive for applications where size is an important factor.

These problems have been solved to some degree by the single-block ceramic filters of the type shown and described in U.S. Pat. Nos. 4,426,631, 4,431,977 and 4,462,098. In particular, the filter described in U.S. Pat. No. 4,431,977 includes a dielectric block having a plurality of circular holes coupled to one another primarily by way of the dielectric between them. Coupling between the circular holes is adjusted by varying the depth of slots or the size and location of additional holes, rendering the tuning of such filters both complicated and difficult. Furthermore, the location of the input and output electrodes near the ground plating creates undesired capacitive loading.

OBJECTS AND SUMMARY OF THE INVENTION

Accordingly, it is an object of the present invention to provide an improved single-block ceramic filter having a pole/zero frequency response characteristic that is easily tuned to provide one or more desired pass and stop bands.

It is another object of the present invention to provide an improved single-block ceramic filter having a plurality of elongated holes wherein the undesired electrical signal coupling between the holes is substantially reduced.

It is a further object of the present invention to provide an improved single-block filter having isolated input and output electrodes for minimizing undesired electrical signal coupling between the input and output electrodes and electrical signal ground.

Briefly described, the present invention encompasses a filter comprised of a dielectric block having top and bottom surfaces and being covered with a conductive material, at least two holes extending from the top surface of the dielectric block toward the bottom surface thereof and being disposed at a predetermined distance from one another, and first and second coupling circuitry such as electrodes coupled to a first hole and a second hole, respectively, and capacitive strips for resonating each hole for a pole and each pair of holes for a zero. The capacitive strips are not covered by the conductive material and substantially surround each hole. According to a further feature of the present invention, the first and second electrodes may be isolated from the conductive material covering the dielectric block by substantially surrounding the first and second electrodes with conductive material from the adjacent hole.

DETAILED DESCRIPTION OF THE PREFERRED EMBODIMENT

Figure 1:
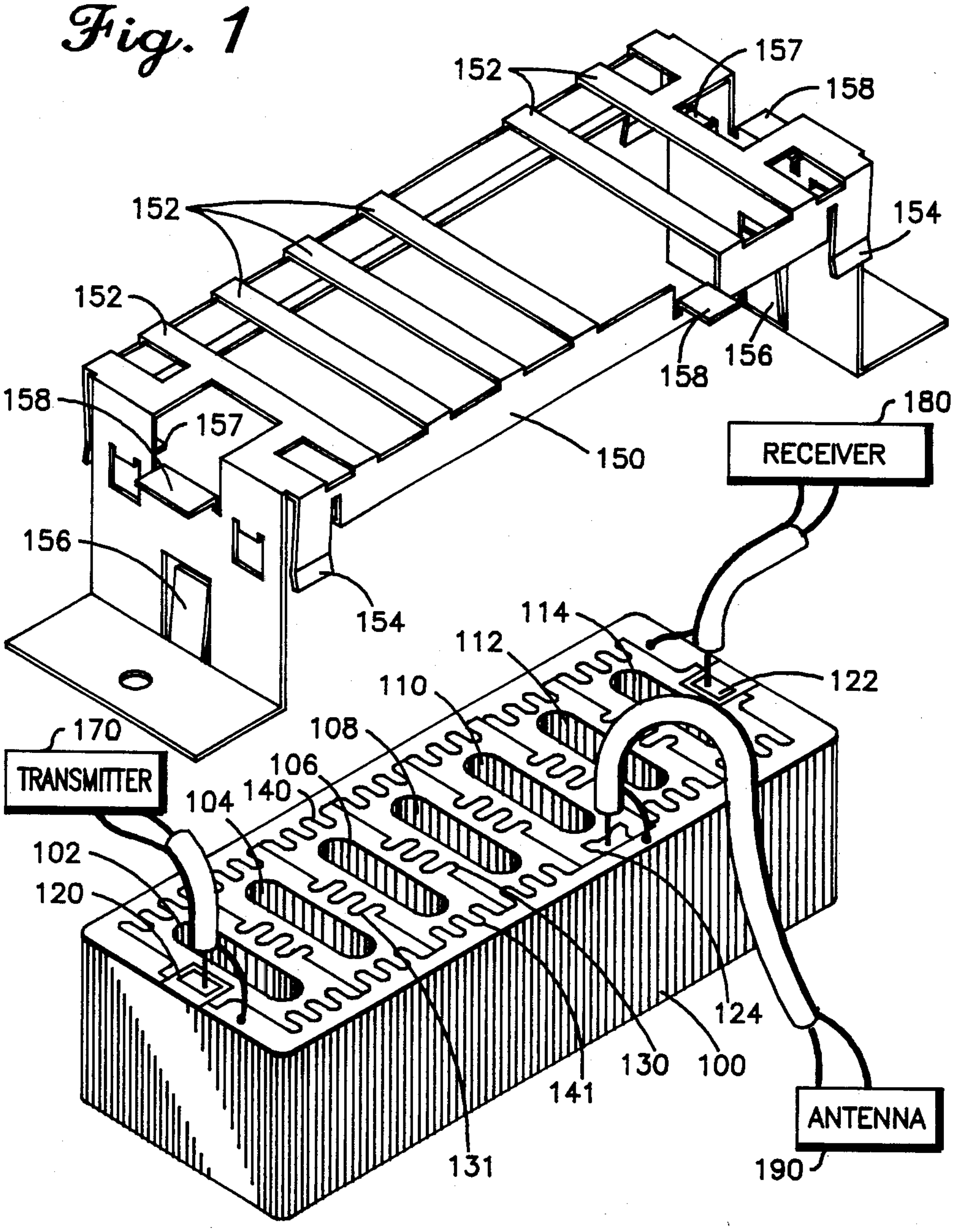
FIG. 1 is a perspective view of a single-block dual-passband ceramic filter embodying the present invention.

Referring to FIG. 1, there is illustrated a single-block dual-passband ceramic filter 100 embodying the present invention. Filter 100 provides both pass and stop bands in a single block. Filter 100 includes a block which is comprised of a dielectric material that is selectively covered or plated with a conductive material. Filter 100 can be constructed of any suitable dielectric material that has low-loss, a high dielectric constant and a low temperature coefficient of dielectric constant. In the preferred embodiment, filter 100 is comprised of a ceramic compound including barium oxide, titanium oxide and zirconium oxide, the electrical characteristics of which are similar to those described in more detail in an article by G.H. Jonker and W. Kwestroo, entitled "The Ternery Systems $BaO-TiO_2-SnO_2$ and $BaO-TiO_2-ZrO_2$", Published in the Journal of the Amercian Ceramic Society, Volume 41, no. 10 at pages 390–394, October 1958. Of the ceramic compounds described in this article, the compound in table VI having the composition 18.5 mole percent BaO, 77.00 mole percent $TiO_2$ and 4.5 mole percent $ZrO_2$ and having a dielectric constant of approximately 40 is well suited for use in the ceramic filter 100 of the present invention.

In the preferred embodiment of filter 100, copper or silver is used to cover or plate the block with an electrically conductive material. Filter 100 includes seven holes 102, 104, 106, 108, 110, 112, and 114 having an elongated cross section, which each extend from the top surface to the bottom surface thereof. Holes 102, 104, 106, 108, 110, 112 and 114 are likewise plated. Although filter 100 is shown with seven holes, only two holes need be utilized in practicing the present invention.

Each hole 102, 104, 106, 108, 110, 112 and 114 is further separated one from another by unplated capacitive strips such as 130 and 131. Moreover, each hole is completely surrounded by capacitive strips, such as strips 130, 131, 140, 141 surrounding hole 106. The width of the capacitive strips 130, 131 is adjusted to resonate the odd mode transmission lines or zeros formed by holes 106, 108 and 104, 106 in the stop band of the transmitter filter. The width of capacitive strips 140, 141 is adjusted to resonate the transmission line or pole formed by hole 106 and ground in the passband of the transmitter filter. According to an important feature of the present invention, strips 130 and 131 provide capacitive coupling between adjacent holes 106 and 108 and adjacent holes 104 and 106, respectively for producing a corresponding zero either above or below the passband of filter 100. Strips 130 and 131 further include sinusoidal shaped portions so that the coupling between adjacent holes 106 and 108 and 104 and 106, respectively can be easily adjusted by simply removing plating near strips 130 and 131 to widen the strips. Although capacitive strips have been utilized in the preferred embodiment, any suitable capacitive device or circuitry can be utilized to resonate each hole for a pole and each pair of holes for a zero in practicing the present invention.

Filter 100 in FIG. 1 also includes electrodes 120, 122 and 124 for coupling input/output signals thereto. In the preferred embodiment, electrode 120 is coupled to the output of transmitter 170, electrode 122 is coupled to the input of receiver 180, and electrode 124 is coupled to antenna 190. In this duplexer embodiment, filter 100 provides two passbands for applying the RF signal from transmitter 170 to antenna 190 and applying the RF signal received by antenna 190 to receiver 180. Filter 100 is likewise applicable to any suitable signal combining/sorting application where signals in two different frequency bands are applied to or received from a common device.

According to another feature of the present invention, electrodes 120 and 122 in filter 100 in FIG. 1 are substantially surrounded by the plating associated with holes 102 and 114, respectively. As a result, electrodes 120 and 122 are substantially isolated from the rest of the plating on the dielectric block which is coupled to electrical signal ground. Since electrodes 120 and 122 are isolated from electrical signal ground, undesired capacative coupling to electrical signal ground is minimized thereby improving the electrical characteristics of filter 100.

Also illustrated in FIG. 1 is a bracket 150 which is attached to filter 100 for facilitating mounting of filter 100 in other apparatus such as a radio transceiver and also for further reducing undesired out-of-band responses. Bracket 150 includes strips 152 which are oriented above corresponding holes in filter 100. Since strips 152 only cover corresponding holes, capacitive strips 130, 131 may be tuned when bracket 150 is attached to filter 100. Tabs 154, 156 and 157 assist in positioning and holding bracket 150 on filter 100. Bracket 150 may be securely attached to filter 100 by means of soldering or any other suitable bonding means. Tabs 158 may be attached to corresponding input/output cables which are in turn coupled to electrodes 120, 122 and 124 of filter 100.

Figure 2:
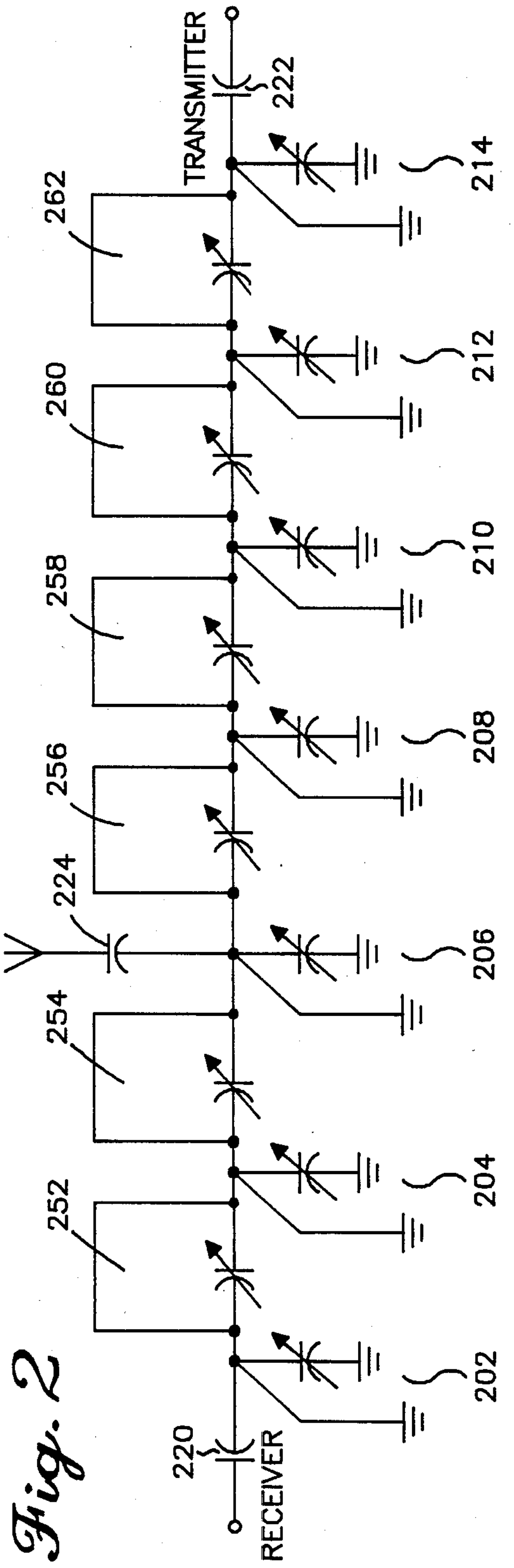
FIG. 2 is an electrical circuit for the ceramic filter shown in FIG. 1.

Referring to FIG. 2, there is illustrated a corresponding electrical circuit for filter 100 in FIG. 1. Filter 100 includes seven poles 202, 204, 206, 208, 210, 212 and 214 primarily created by corresponding holes 102, 104, 106, 108, 110, 112 and 114 which act as TEM mode transmission lines. Poles 202 and 204 primarily produce the receiver passband, and poles 208, 210, 212 and 214 primarily produce the transmitter passband. Pole 206 is primarily tuned to match the antenna. The transmission line lengths of poles 202, 204, 206, 208, 210, 212 and 214 are adjusted primarily by adjusting the height of the ceramic block. The variable capacitance of poles 202, 204, 206, 208, 210, 212 and 214 may be adjusted by removing plating near capacitive strips (such as 140 and 141) near the sides of corresponding holes (such as 106) to widen the strips. Filter 100 also includes six zeros 252, 254, 256, 258, 260 and 262 which are each represented by an odd mode transmission line created by adjacent holes and an adjustable capacitance created by the capacitive strips. Zeros 252 and 254 produce a stopband at the transmitter frequencies, and zeros 256, 258, 260 and 262 produce a stopband at the receiver frequencies. The capacitance of zeros 252, 254, 256, 258, 260 and 262 may be adjusted by removing plating near capacitive strips (such as 130) between adjacent holes (such as 106 and 108) in filter 100 to widen the strips. Thus, by adjusting the height of the ceramic block and by removing plating near capacitive strips, filter 100 can be tuned to provide two different and selective electrical signal passbands.

Figure 5:
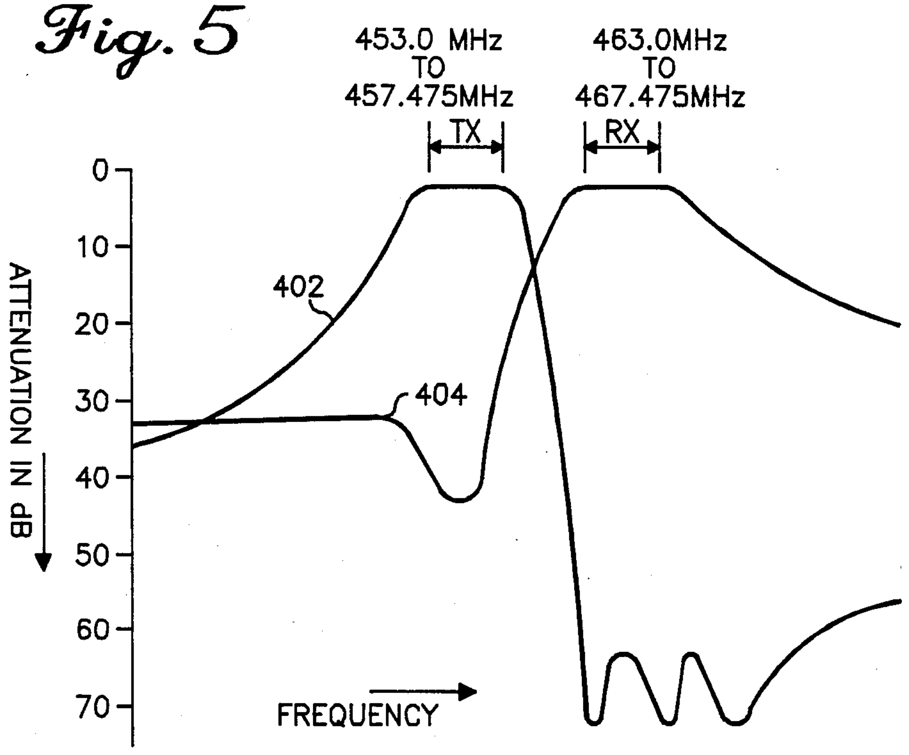
FIG. 5 illustrates waveforms for typical transmitter and receiver frequency responses of the ceramic filter shown in FIG. 1.
Figure 6:
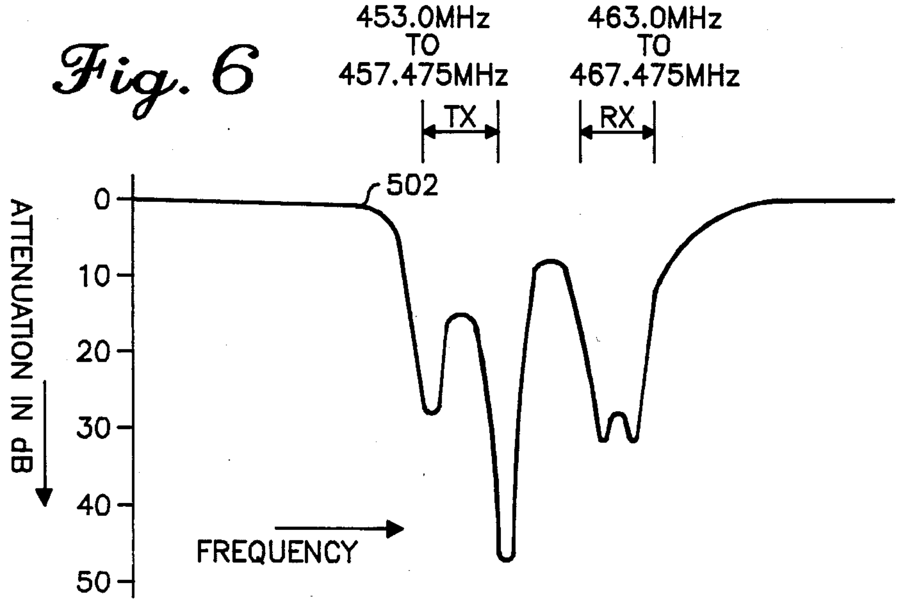
FIG. 6 illustrates a waveform of the typical antenna return loss of the ceramic filter shown in FIG. 1.

In FIG. 5, there is illustrated typical transmitter and receiver frequency responses 402 and 404 of filter 100 which has been tuned to a transmitter passband of 453 MHz to 457.475 MHz and a receiver passband of 463 MHz to 467.475 MHz, respectively. The corresponding antenna return loss for the same filter is illustrated by waveform 502 in FIG. 6. A filter 100 exhibiting substantially the same electrical characteristics as illustrated by the waveforms in FIGS. 5 and 6 has the following approximate dimensions, 81.3 mm in length, 30.0 mm in width and 20.4 mm in height, with elongated holes having elliptical-shaped openings on the top surface with approximate dimensions of 17.2 mm in length and 4.3 mm in width, as illustrated in FIG. 1.

Figure 3:
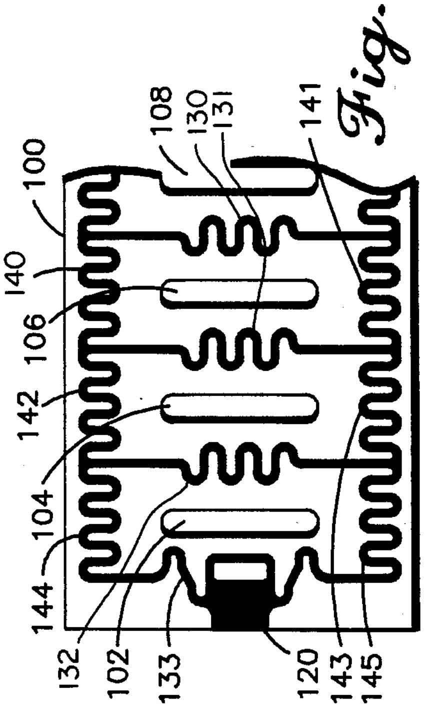
FIG. 3 is a top view of a portion of the ceramic filter shown in FIG. 1.

Referring to FIG. 3, there is illustrated a top view of a portion of filter 100 in FIG. 1. Capacitive strips 130–133 and 140–145 surround holes 102, 104 and 106 and isolate electrode 120 from electrical signal ground. According to a feature of the present invention, electrode 120 is substantially surrounded by the plating associated with hole 102. Also illustrated more clearly in FIG. 3 are elongated holes 102, 104 and 106. Holes 102, 104 and 106 have an elongated cross section and are substantially parallel along the direction of elongation and colinear along their centers. According to yet another feature of the present invention, undesired coupling from hole 102 to non-adjacent hole 106 is minimized by using holes having an elongated cross section.

Figure 4:
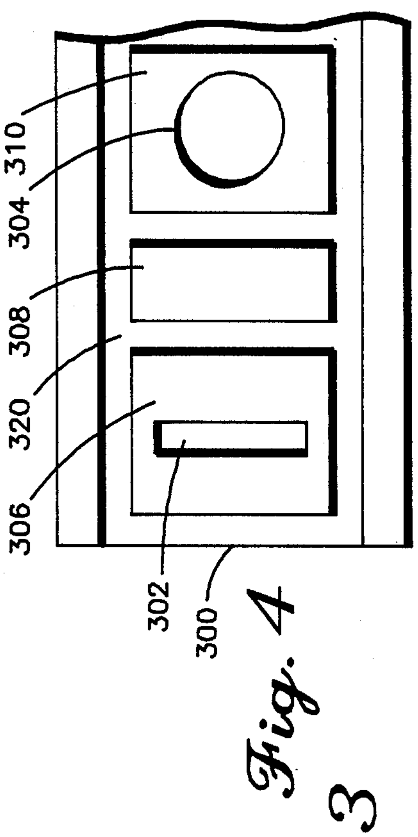
FIG. 4 is a top view of an alternative embodiment of the ceramic filter of the present invention.

Referring next to FIG. 4, there is illustrated a top view of an alternative embodiment of the ceramic filter of the present invention. Filter 300 includes unplated capacitive strips 320, a rectangular hole 302 and a circular hole 304. In addition, opposing plated areas 306 and 310 associated with holes 302 and 304, respectively are separated from one another by plated area 308. As a result, the total capacitance coupling hole 302 to 304 is comprised of the combination of the capacitance of the capacitive strips between opposing plated areas 306 and 308 and opposing plated areas 308 and 310. The equivalent capacitance between holes 302 and 304 is in this case the total of the capacitance for the capacitive strips 320 between plated areas 306 and 308 and plated areas 308 and 310. Thus, the size and shape of the holes and additional strips can be utilized in various embodiments of the ceramic filter of the present invention.

In summary, a unique single-block ceramic filter has been described that may provide one or more desired pass and stop bands. By utilizing capacitive strips around each hole of the ceramic filter, a pole/zero frequency response characteristic is achieved. The inventive ceramic filter can be easily tuned simply by removing plating from the sinusoidal portions of the capacitive strips around each hole to widen the strips. The single-block ceramic filter of the present invention may be advantageously utilized in any suitable signal combining/sorting application where one or more signals are applied to or received from a common device.

I claim:

1. A filter comprising:

dielectric means comprised of a dielectric material and having top, bottom and side surfaces, said surfaces of the dielectric means being substantially covered with a conductive material;

at least two holes, having surfaces substantially covered with a conductive material, extending from the top surface of the dielectric means toward the bottom surface thereof and having openings on the top surface of the dielectric means, said openings being disposed at a predetermined distances from one another;

first and second coupling means coupled to a first hole and a second hole, respectively, of said at least two holes; and capacitive means including strips of the top surface of the dielectric means which substantially surround each hole, said strips being portions of the top surface which are not covered with said conductive material, said strips having a width for determining the capacitance thereof, and said strips between said holes including substantially sinusoidal shaped portions.

2. The filter according to claim 1, wherein said first and second coupling means includes first and second electrode means disposed on the top surface of the dielectric means near, and coupled to said first and second holes, respectively.

3. The filter according to claim 2, wherein said first and second electrode means each include a portion of the top surface of the dielectric means covered with said conductive material and surrounded by another portion of the top surface which is not covered by said conductive material.

4. The filter according to claim 1, wherein said openings of said holes each have two elongated sides arranged substantially parallel to one another.

5. A filter comprising:

dielectric means comprised of a dielectric material having top, bottom and sides surfaces, said surfaces of the dielectric means being substantially covered with a conductive material;

at least three holes, having surfaces substantially covered with a conductive material, extending from the top surface of the dielectric means toward the bottom surface thereof and having openings on the top surface of the dielectric means, said openings being disposed at predetermined distances relative to one another and substantially aligned with one another;

first, second and third coupling means coupled to a first hole, a second hole and a third hole, respectively, of said at least three holes; and capacitive means including strips of the top surface of the dielectric means which substantially surround each hole, said strips being portions of the top surface which are not covered with said conductive material, said strips having a width for determining the capacitance thereof, and said strips between said holes including substantially sinusoidal shaped portions.

6. The filter according to claim 5, wherein said first, second and third coupling means include first, second and third electrode means disposed on the top surface of the dielectric means near, and coupled to said first, second and third holes, respectively.

7. The filter according to claim 6, wherein said first, second, and third electrode means each include a portion of the top surface of the dielectric means covered with said conductive material and surrounded by another portion of the top surface which is not covered by said conductive material.

8. The filter according to claim 5, wherein said openings of said holes each have two elongated sides arranged substantially parallel to one another.

9. A filter comprising:

a dielectric block comprised of a dielectric material having top, bottom and side surfaces, said surfaces of the dielectric block being substantially covered with a conductive material;

at least two holes, having surfaces substantially covered with a conductive material, extending from the top surface of the dielectric block toward the bottom surface thereof and having openings on the top surface of the dielectric block, said openings being disposed at predetermined distances from one another;

first and second coupling means coupled to a first hole and a second hole, respectively, of said at least two holes; and capacitive means including strips of the top surface of the dielectric block which substantially surround each hole, said strips being portions of the top surface which are not covered with said conductive material, said strips having a width for determining the capacitance thereof, and said strips between said holes including substantially sinusoidal shaped portions.

10. A filter comprising:

a dielectric block comprised of a dielectric material having top, bottom and side surfaces, said surfaces of the dielectric block being substantially covered with a conductive material;

at least three holes, having surfaces substantially covered with a conductive material, extending from the top surface of the dielectric block toward the bottom surface thereof and having openings on the top surface of the dielectric block, said openings being disposed at predetermined distances relative to one another and substantially aligned with one another;

first, second and third coupling means coupled to a first hole, a second hole and a third hole, respectively, of said at least three holes; and capacitive means including strips of the top surface of the dielectric block which substantially surround each hole, said strips being portions of the top surface which are not covered with said conductive material, said strips having a width for determining the capacitance thereof, and said strips between said holes including substantially sinusoidal shaped portions.

11. A filter for filtering an input signal from a signal source, comprising:

dielectric means comprised of a dielectric material having top, bottom and side surfaces, said surfaces of the dielectric means being substantially covered with a conductive material;

at least two holes, having surfaces substantially covered with a conductive material, extending from the top surface of the dielectric means toward the bottom surface thereof and having openings on the top surface of the dielectric means, said openings being disposed at a predetermined distances from one another and substantially aligned with one another;

first and second coupling means coupled to a first hole and a second hole, respectively, of said at least two holes, said first coupling means further being coupled to the input signal and said second coupling means providing an output signal representing the filtered input signal; and capacitive means including strips of the top surface of the dielectric means which substantially surround each hole, said strips being portions of the top surface which are not covered with said conductive material, said strips having a width for determining the capacitance thereof, and said strips between said holes including substantially sinusoidal shaped portions.

12. A multi-passband filter for coupling a radio-frequency (RF) signal from a RF transmitter to an antenna and coupling another RF signal from the antenna to an RF receiver, comprising:

dielectric means comprised of a dielectric material having top, bottom and side surfaces, said surfaces of the dielectric means being substantially covered with a conductive material;

at least three holes, having surfaces substantially covered with a conductive material, extending from the top surface of the dielectric means toward the bottom surface thereof and having openings on the top surface of the dielectric means, said openings being disposed at predetermined distances relative to one another and substantially aligned with one another;

first, second and third coupling means coupled to a first hole, a second hole and a third hole, respectively, of said at least three holes, said first coupling means further being coupled to the RF transmitter, said second coupling means further being coupled to the antenna, and said third coupling means further being coupled to the RF receiver; and capacitive means including strips of the top surface of the dielectric means which substantially surround each hole, said strips being portions of the top surface which are not covered with said conductive material, said strips having a width for determining the capacitance thereof, and said strips between said holes including substantially sinusoidal shaped portions.

13. (Three Times Amended) A radio transceiver comprising:

(a) a radio receiver having an input;

(b) a radio transmitter having an output;

(c) an antenna; and (d) a multi-passband filter comprising:

dielectric means comprised of a dielectric material having top, bottom and side surfaces, said surfaces of the dielectric means being substantially covered with a conductive material;

at least three holes, having surfaces substantially covered with a conductive material, extending from the top surface of the dielectric means toward the bottom surface thereof and having openings on the top surface of the dielectric means, said openings being disposed at predetermined distances relative to one another and substantially aligned with one another;

first, second and third coupling means coupled to a first hole, a second hole and a third hole, respectively, of said at least three holes, said first coupling means further being coupled to the output of the radio transmitter, said second coupling means further being coupled to the antenna, and said third coupling means further being coupled to the input of the radio receiver; and capacitive means including strips of the top surface of the dielectric means which substantially surround each hole, said strips being portions of the top surface which are not covered with said conductive material, said strips having a width for determining the capacitance thereof, and said strips between said holes including substantially sinusoidal shaped portions.

14. (Twice Amended) A filter comprising:

a dielectric block comprised of a dielectric material and having top, bottom and side surfaces, said bottom and side surfaces of the dielectric block being substantially covered with a conductive material;

a plurality of holes, having surfaces substantially covered with a conductive material, extending from the top surface of the dielectric block toward the bottom surface thereof and having openings on the top surface of the dielectric block, said openings being disposed at predetermined distances from one another;

first and second coupling means coupled to a first hole and a second hole, respectively, of said plurality of holes; and capacitive means including first and second electrode means each comprised of a conductive material covering a portion of the top surface of said dielectric block, the conductive material of said first electrode means and the conductive material of said second electrode means being coupled to the conductive material of two holes, respectively, of said plurality of holes, and the conductive material of said first electrode means and the conductive material of said second electrode means opposing one another and being separated from one another by a portion of the top surface of said dielectric block not covered by any conductive material and having a predetermined width for capacitively intercoupling said two holes.

15. The filter according to claim 14, wherein said first and second coupling means includes first and second coupling electrode means disposed on the top surface of the dielectric block near, and coupled to the conductive material of said first and second holes, respectively.

16. The filter according to claim 15, wherein said first and second coupling means each includes a portion of the top surface of the dielectric block covered with said conductive material.

17. The filter according to claim 14, further including third electrode means interposed between and capacitively intercoupling said first and second electrode means.

18. A filter comprising:

a dielectric block comprised of a dielectric material and having top, bottom and side surfaces, said bottom and side surfaces of the dielectric block being substantially covered with a conductive material;

a plurality of holes, having surfaces substantially covered with a conductive material, extending from the top surface of the dielectric block toward the bottom surface thereof and having openings on the top surface of the dielectric block, said openings being disposed at predetermined distances from one another;

first and second coupling means coupled to a first hole and a second hole, respectively, of said plurality of holes; and capacitive means including first and second electrode means each comprised of a conductive material covering a portion of the top surface of said dielectric block, the conductive material of said first electrode means and the conductive material of said second electrode means being coupled to the conductive material of two holes, respectively, of said plurality of holes, the conductive material of said first electrode means and the conductive material of said second electrode means opposing one another and being separated from one another by a first portion of the top surface of said dielectric block not covered by any conductive material and having a predetermined width for capacitively intercoupling said two holes, and the conductive material of said first electrode means opposing the conductive coating on one of the side surfaces of said dielectric block and being separated from one another by a second portion of the top surface of said dielectric block not covered by any conductive material and having a predetermined width for capacitively coupling the corresponding one of said two holes to the conductive coating on said one of the side surfaces of said dielectric block.

19. The filter according to claim 18, wherein said first and second coupling means include first and second coupling electrode means disposed on the top surface of the dielectric block near, and coupled to the conductive material of said first and second holes, respectively.

20. The filter according to claim 19, wherein said first and second coupling means each include a portion of the top surface of the dielectric block covered with said conductive material.

21. The filter according to claim 15, further including third electrode means interposed between and capacitively intercoupling said first and second electrode means.

22. A filter comprising:

dielectric means comprised of a dielectric material and having top, bottom and side surfaces, said surfaces of the dielectric means being substantially covered with a conductive material;

at least three holes, having surfaces substantially covered with a conductive material, extending from the top surface of the dielectric means toward the bottom surface thereof and having openings on the top surface of the dielectric means, said openings being disposed at predetermined distances relative to one another and substantially aligned with one another;

first and second coupling means coupled to a first hole and a second hole, respectively, of said at least three holes; and capacitive means including strips of the top surface of the dielectric means which substantially surround at least two holes of said at least three holes, said strips being portions of the top surface which are not covered with said conductive material, said strips having a width for determining the capacitance thereof, and said strips between said holes including substantially sinusoidal shaped portions.

23. A multi-passband filter for coupling a radio-frequency (RF) signal from a RF transmitter to an antenna and coupling another RF signal from the antenna to an RF receiver, comprising:

a dielectric block comprised of a dielectric material having top, bottom and side surfaces, said bottom and side surfaces of the dielectric block being substantially covered with a conductive material;

at least three holes, having surfaces substantially covered with a conductive material, extending from the top surface of the dielectric block toward the bottom surface thereof and having openings on the top surface of the dielectric block, said openings being disposed at predetermined distances relative to one another and substantially aligned with one another;

first, second and third coupling means coupled to a first hole, a second hole and a third hole, respectively, of said at least three holes, said first coupling means further being coupled to the RF transmitter, said second coupling means further being coupled to the antenna, and said third coupling means further being coupled to the RF receiver; and capacitive means including first and second electrode means each comprised of a conductive material covering a portion of the top surface of said dielectric block, the conductive material of said first electrode means and the conductive material of said second electrode means being coupled to the conductive material of at least two holes, respectively, of said at least three holes, and the conductive material of said first electrode means and the conductive material of said second electrode means opposing one another and being separated from one another by a portion of the top surface of said dielectric block not covered by any conductive material and having a predetermined width for capacitively intercoupling said two holes.

24. A multi-passband filter for coupling a radio-frequency (RF) signal from a RF transmitter to an antenna and coupling another RF signal from the antenna to an RF receiver, comprising:

a dielectric block comprised of a dielectric material having top, bottom and side surfaces, said bottom and side surfaces of the dielectric block being substantially covered with a conductive material;

at least three holes, having surfaces substantially covered with a conductive material, extending from the top surface of the dielectric block toward the bottom surface thereof and having openings on the top surface of the dielectric block, said openings being disposed at predetermined distances relative to one another and substantially aligned with one another;

first, second and third coupling means coupled to a first hole, a second hole and a third hole, respectively, of said at least three holes, said first coupling means further being coupled to the RF transmitter, said second coupling means further being coupled to the antenna, and said third coupling means further being coupled to the RF receiver; and capacitive means including first and second electrode means each comprised of a conductive material covering a portion of the top surface of said dielectric block, the conductive material of said first electrode means and the conductive material of said second electrode means being coupled to the conductive material of two holes, respectively, of said at least three holes, the conductive material of said first electrode means and the conductive material of said second electrode means opposing one another and being separated from one another by a first portion of the top surface of said dielectric block not covered by any conductive material and having a predetermined width for capacitively intercoupling said two holes, and the conductive material of said first electrode means opposing the conductive coating on one of the side surfaces of said dielectric block and being separated from one another by a second portion of the top surface of said dielectric block not covered by any conductive material and having a predetermined width for capacitively coupling the corresponding one of said two holes to the conductive coating on said one of the side surfaces of said dielectric block.

25. A multi-passband filter for coupling a radio-frequency (RF) signal from a RF transmitter to an antenna and coupling another RF signal from the antenna to an RF receiver, comprising:

dielectric means comprised of a dielectric material having top, bottom and side surfaces, said surfaces of the dielectric means being substantially covered with a conductive material;

at least three holes, having surfaces substantially covered with a conductive material, extending from the top surface of the dielectric means toward the bottom surface thereof and having openings on the top surface of the dielectric means, said openings being disposed at predetermined distances relative to one another and substantially aligned with one another;

first, second and third coupling means coupled to a first hole, a second hole and a third hole, respectively, of said at least three holes, said first coupling means further being coupled to the RF transmitter, said second coupling means further being coupled to the antenna, and said third coupling means further being coupled to the RF receiver; and capacitive means including strips of the top surface of the dielectric means that substantially surround at least two holes of said at least three holes, said strips being portions of the top surface which are not covered with said conductive material, said strips having a width for determining the capacitance thereof, and said strips between said holes including substantially sinusoidal shaped portions.

26. A filter comprising:

dielectric means comprised of a dielectric material and having top, bottom and side surfaces, said bottom and side surfaces of the dielectric means being substantially covered with a conductive material;

a plurality of holes, having surfaces substantially covered with a conductive material, extending from the top surface of the dielectric means toward the bottom surface thereof and having openings on the top surface of the dielectric means, said openings being disposed at predetermined distances from one another, and said openings each having two elongated sides arranged substantially parallel to one another;

first and second coupling means coupled to a first hole and a second hole, respectively, of said plurality of holes; and capacitive means including first and second electrode means coupled to the conductive material of and surrounding the openings of two holes, respectively, of said plurality of holes, for capacitively intercoupling said two holes, at least one of said first and second electrode means each further being capacitively coupled to the conductive material on the side surfaces of said dielectric means.

27. A filter comprising:

dielectric means comprised of a dielectric material and having top, bottom and side surfaces, said bottom and side surfaces of the dielectric means being substantially covered with a conductive material;

a plurality of holes, having surfaces substantially covered with a conductive material, extending from the top surface of the dielectric means toward the bottom surface thereof and having openings on the top surface of the dielectric means, said openings being disposed at predetermined distances from one another;

first and second coupling means coupled to a first hole and a second hole, respectively, of said plurality of holes;

capacitive means including first and second electrode means coupled to the conductive material of and surrounding the openings of two holes, respectively, of said plurality of holes, for capacitively intercoupling said two holes, at least one of said first and second electrodes means each further being capacitively coupled to the conductive material on the side surfaces of said dielectric means; and bracket means coupled to said dielectric means for at least partially enclosing the top surface of said dielectric means, said bracket means further including at least first and second tab means for attaching said bracket means to utilization means.

28. A filter comprising:

dielectric means comprised of a dielectric material and having top, bottom and side surfaces, said bottom and side surfaces of the dielectric means being substantially covered with a conductive material;

at least three holes, having surfaces substantially covered with a conductive material, extending from the top surface of the dielectric means toward the bottom surface thereof and having openings on the top surface of the dielectric means, said openings being disposed at predetermined distances from one another and substantially aligned with one another, and said openings each having two elongated sides arranged substantially parallel to one another;

first and second coupling means coupled to a first hole and a second hole, respectively, of said at least three holes; and capacitive means including first and second electrode means coupled to the conductive material of and surrounding the openings of two holes, respectively, of said at least three holes, for capacitively intercoupling said two holes, at least one of said first and second electrode means each further being capacitively coupled to the conductive material on the side surfaces of said dielectric means.

29. A filter comprising:

dielectric means comprised of a dielectric material and having top, bottom and side surfaces, said bottom and side surfaces of the dielectric means being substantially covered with a conductive material;

at least three holes, having surfaces substantially covered with a conductive material, extending from the top surface of the dielectric means toward the bottom surface thereof and having openings on the top surface of the dielectric means, said openings being disposed at predetermined distances from one another and substantially aligned with one another;

first and second coupling means coupled to a first hole and a second hole, respectively, of said at least three holes;

capacitive means including first and second electrode means coupled to the conductive material of and surrounding the openings of two holes, respectively, of said at least three holes, for capacitively intercoupling said two holes, at least one of said first and second electrode means each further being capacitively coupled to the conductive material on the side surfaces of said dielectric means; and bracket means coupled to said dielectric means for at least partially enclosing the top surface of said dielectric means, said bracket means further including at least first and second tab means for attaching said bracket means to utilization means.

30. A filter comprising:

dielectric means comprised of a dielectric material and having top, bottom and side surfaces, said surfaces of the dielectric means being substantially covered with a conductive material;

at least two holes, having surfaces substantially covered with a conductive material, extending from the top surface of the dielectric means toward the bottom surface thereof and having openings on the top surface of the dielectric means, said openings being disposed at a predetermined distances from one another, and said openings each having two elongated sides arranged substantially parallel to one another;

first and second coupling means coupled to a first hole and a second hole, respectively, of said at least two holes; and capacitive means for capacitively intercoupling said first and second holes, said capacitive means including strips of the top surface of the dielectric means which substantially surround each of said first and second holes, said strips being portions of the top surface which are are not covered with said conductive material, and said strips having a width for determining the capacitance thereof.

31. A filter comprising:

dielectric means comprised of a dielectric material and having top, bottom and side surfaces, said surfaces of the dielectric means being substantially covered with a conductive material;

at least two holes, having surfaces substantially covered with a conductive material, extending from the top surface of the dielectric means toward the bottom surface thereof and having openings on the top surface of the dielectric means, said openings being disposed a predetermined distances from one another;

first and second coupling means coupled to a first hole and a second hole, respectively, of said at least two holes;

capacitive means for capacitively intercoupling said first and second holes, said capacitive means including strips of the top surface of the dielectric means which substantially surround each of said first and second holes, said strips being portions of the top surface which are are not covered with said conductive material, and said strips having a width for determining the capacitance thereof; and bracket means coupled to said dielectric means for at least partially enclosing the top surface of said dielectric means, said bracket means further including at least first and second tab means for attaching said bracket means to utilization means.

* * * * *